Dec. 15, 1964   C. S. KNAB ETAL   3,161,283
BELT TRACKING MECHANISM
Filed Dec. 30, 1960   2 Sheets-Sheet 1

INVENTORS
CLARENCE S. KNAB AND
CLARENCE R. TAYLOR
BY
ATTORNEYS

Dec. 15, 1964

C. S. KNAB ETAL 3,161,283

BELT TRACKING MECHANISM

Filed Dec. 30, 1960

INVENTORS
CLARENCE S. KNAB AND
CLARENCE R. TAYLOR
BY
ATTORNEYS

United States Patent Office 3,161,283
Patented Dec. 15, 1964

3,161,283
BELT TRACKING MECHANISM
Clarence S. Knab and Clarence R. Taylor, Rochester, N.Y., assignors to Eastman Kodak Company, Rochester, N.Y., a corporation of New Jersey
Filed Dec. 30, 1960, Ser. No. 89,331
5 Claims. (Cl. 198—202)

This invention relates to an endless belt and pulley system that is self-correcting for proper tracking of the belt, even where the belt is wide and relatively short.

Crowned pulleys are often used with conveyor belts, to insure proper tracking. Unfortunately, crowned pulleys are not effective when the belt is wide and relatively short.

The use of a pivoted idler roll has been proposed for maintaining proper belt tracking in a conveyor belt system where the belt is long and relatively narrow, and where the contact between the pivoted idler roll and the belt is only tangential. However, where the contact is more tangential, and the belt wraps around the pivoted idler roll to any extent, no substantial corrective action is obtained.

The problem of maintaining a belt in proper tracking position on its pulleys is particularly serious in a machine like a document copier. In such a machine, the belt is usually wide and relatively short, and it is employed to carry an assembly of a document and a sensitized sheet through an exposure zone. In this zone, the assembly is gripped between the belt and a drum that rotates upon movement of the belt, with sufficient pressure so that there is no slippage. While the system must exert sufficient gripping pressure, it must also be able to accommodate documents of different thicknesses.

Such an application therefore requires the use of large tolerances in the pulley and belt system, and also the use of a belt with some elasticity. Both of these conditions have the unfortunate effect of increasing the tendency of the belt to deviate from its proper tracking position.

One object of the present invention is to provide, in a system of an endless belt and pulleys on which the belt runs, effective means for maintaining the belt in its proper tracking position.

Another object of the invention is to provide, in a system of the character described, means to maintain the belt in its proper tracking position without causing undue belt wear.

A further object of the invention is to provide a pulley-belt system that is self-correcting for proper belt tracking, and that is effective even for a short, relatively wide belt. A related object of the invention is to provide a system of the character described that is effective for maintaining the belt in its proper tracking position, despite large assembly tolerances in the pulley-belt system, and despite adverse operating conditions.

Another object of the invention is to provide an improved pulley-belt system for a document copier that is effective in maintaining proper belt tracking even under conditions that tend to cause the belt to move away from its proper tracking position.

Other objects of the invention will be apparent hereinafter from the specification and from the recital of the appended claims.

A pulley-belt system, that is constructed in accordance with our invention, is practical and effective for correcting for proper tracking of the belt. It has two important features. First, a correction pulley is provided, about which the belt is passed. This pulley is mounted for rotation in such a way that it can be rocked to tilt the pulley so that its axis of rotation is shifted or pivoted about a location that is central of the pulleys. Second, a pair of members are disposed along opposite sides of the belt, along the path of the belt in the direction of its movement away from the correction pulley. These members are formed with contact surfaces that are disposed at an angle to the planar path in which the belt travels, adjacent the sides of the belt respectively, for engagement with the marginal portions of the belt, respectively, during improper tracking.

During operation of such a pulley-belt system, whenever the belt tracks improperly and moves laterally of its proper path, a marginal portion of the belt is engaged by one of the contact surfaces, and the belt is moved in a direction normal to its proper path. This produces a force that tilts the correction pulley in a direction that causes the belt to shift back toward its proper path. This corrective action continues until the belt is in its proper path.

Our invention is effective even in a pulley-belt system in which the belt is wide and relatively short. For this reason, the invention is particularly advantageous for use in document copiers, and the drawings illustrate the use of the invention in a document copier.

Figure 1:
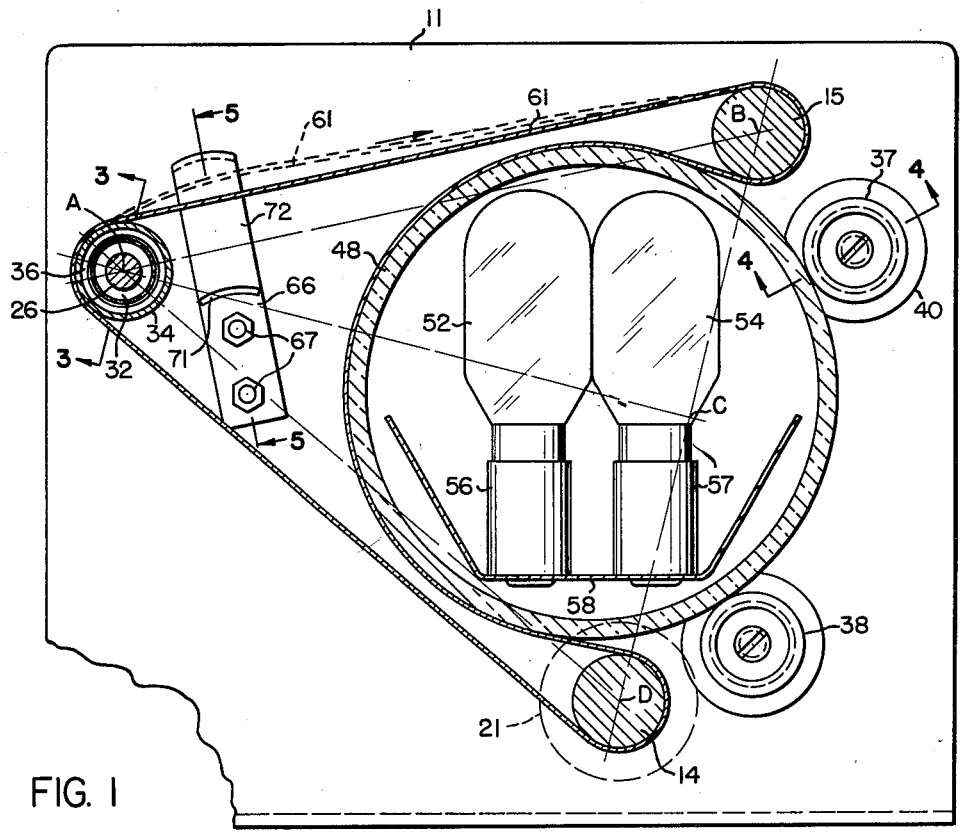
FIG. 1 is a sectional view of a document copier mechanism, showing the pulley-belt system constructed in accordance with one embodiment of the present invention, and taken on the line 1—1 of FIG. 2, looking in the direction of the arrows.

Referring to the drawings in detail by numerals of reference, the numerals 10, 11 refer respectively to the walls of a frame in a document copier. A pair of guide pulleys or rolls 14, 15, respectively, of generally cylindrical figuration, are mounted between the walls 10, 11.

The pulley 14 is mounted on a shaft 16 (FIG. 2) that is journaled at one of its ends in a bearing assembly 17 that is mounted in the wall 10, and that is extended at the other of its ends through a bearing assembly 18 that is mounted in the wall 11. A sprocket 19 is mounted on the extended end 21 of the shaft 16, to provide means by which the pulley 14 can be driven.

The pulley 15 is mounted on a shaft 22 that is journaled at one of its ends in a bearing assembly 24 that is mounted in the wall 10, and that is journaled at the other of its ends in a bearing assembly 25 that is mounted in the wall 11.

Figure 3:
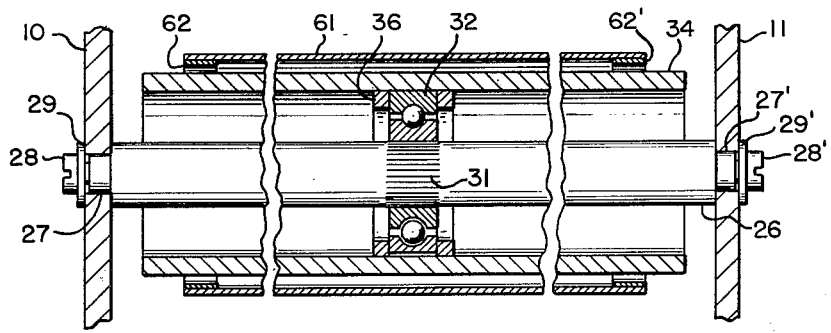
FIG. 3 is a sectional view on an enlarged scale, taken on the line 3—3 of FIG. 1, looking in the direction of the arrows.
Figure 2:
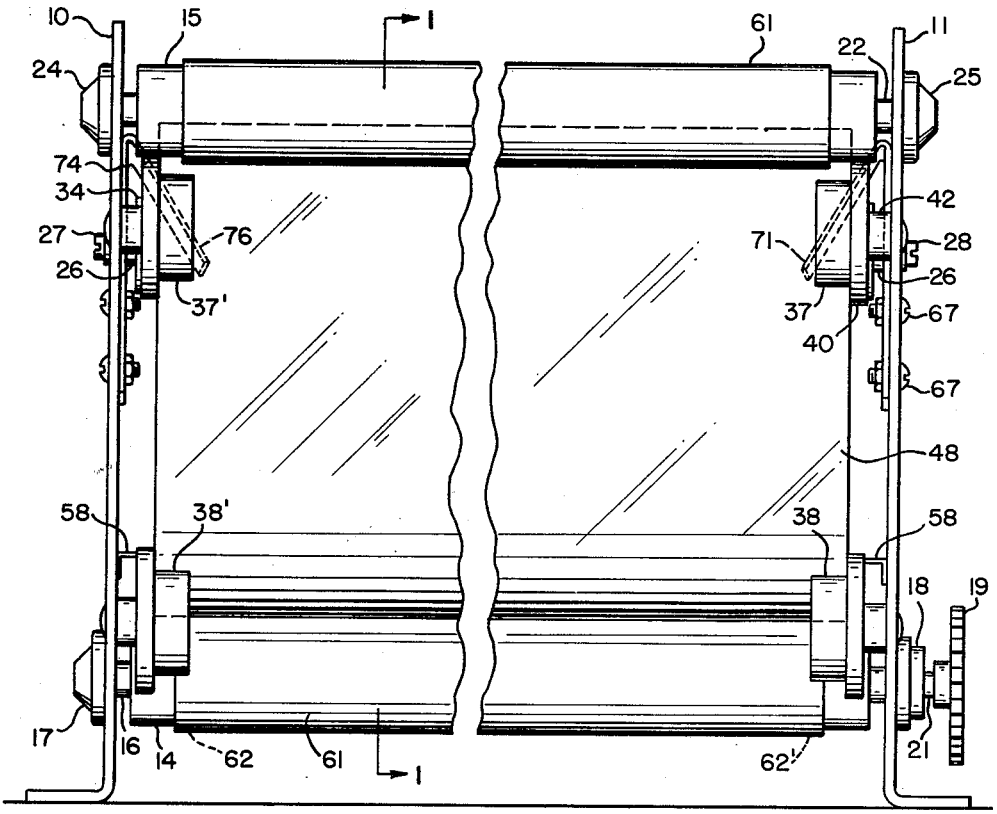
FIG. 2 is a front elevation thereof.

Referring now to FIGS. 1, 2, and particularly to FIG. 3, a shaft 26 is extended between the walls 10, 11. The shaft 26 is formed at its ends with reduced portions 27, 27', that are engaged in apertures in the walls 10, 11, respectively, and that are bored and tapped to receive screws 28, 28'. Washers 29, 29' are interposed between the heads of the screws 28, 28', respectively, and the adjacent portions of the walls 10, 11. The screws 28, 28' hold the shaft 26 rigidly in place. The center line of the shaft 26, and the axes of rotation of the pulleys 14, 15, respectively, are disposed substantially in parallelism, and are located at the apices of an imaginary triangle ABD, as shown in FIG. 1.

The shaft 26 is formed with a central, knurled portion 31. The inner race of a ball bearing 32 is press-fitted on this knurled portion 31 of the shaft 26. A cylindrical pulley or roller 34 is mounted on the outer race of the bearing 32. A pair of retainer rings 36, that are secured to the cylindrical pulley 34, are disposed at each side of the bearing 32, to position the pulley 34 thereon. The bearing 32 is made with large tolerances so that it is loose, to permit the pulley 34 to be rocked on the bearing so as to tilt its axis of rotation.

Referring again to FIG. 1, a pair of rollers 37, 38 are rotatably mounted on the wall 11. A corresponding pair of rollers 37', 38' are mounted on the wall 10, as shown in FIG. 2, in similar locations.

Figure 4:
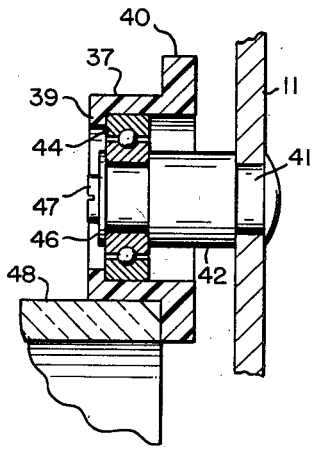
FIG. 4 is a sectional view on an enlarged scale, taken on the line 4—4 of FIG. 1, looking in the direction of the arrows.
Figure 5:
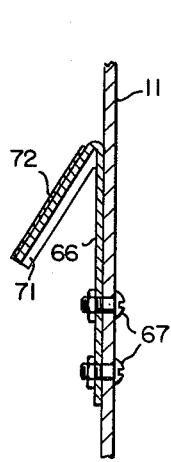
FIG. 5 is a sectional view taken on the line 5—5 of FIG. 1 looking in the direction of the arrows.

These four rollers are similar in shape and all are mounted in similar fashion. The shape and mounting of the roller 37 is exemplary, as illustrated in FIG. 4. The roller 37 is generally cylindrical in section. It is formed at one end with an inwardly directed flange 39, and at its other end, with an outwardly directed flange 40. It is rotatably supported from the wall 11 by structure that includes a pin 41 that is engaged in an aperture in the wall 11 and that projects therefrom. A spacer 42 is mounted over the projecting part of the pin 41, adjacent the wall 11, and a ball bearing 44 is also mounted on the projecting part of the pin 41, abutted against the spacer 42. A washer 46 is secured at the end of the pin by a screw 47, to retain the bearing 44 in place. The roller 37 is seated on the outer race of the bearing 44 and its flange 39 is abutted against the side of the bearing.

A relatively large diameter, transparent tube 48 is mounted to engage against the four rollers 37, 38, 37', 38'. These rollers are relatively narrow in axial extent, and they engage against the peripheral surface of the tube 48 only at its ends, respectively. The flange 40 of the roller 37, and the corresponding flanges of the other rollers, engage against the axial ends of the tube 48 to hold it against displacement in an axial direction. A source of radiant energy, such as the bulbs 52, 54, is disposed within the tube 48. The bulbs may be mounted, for example, in sockets 56, 57, that are mounted on a metal bracket 58 that is supported from one or both of the walls.

A thin, relatively wide belt 61 is mounted about the three pulleys 14, 15, 34, and is directed reversely about the pulleys 14, 15, and is passed about the tube 48. The belt 61 is proportioned to press the tube 48 against the rollers 37, 38, 37' and 38'. The belt 61 is made with cloth that is coated with a synthetic resinous material such as, for example, a vinyl resin, but it may be made from any other material that would be suitable for the application. It is reinforced along its marginal portions with wear strips 62, 62'.

A suitable drive mechanism (not shown) is arranged to drive the pulley 14 through its sprocket 19. The drive mechanism is arranged to drive the belt 61 in a consistent direction that is indicated by the arrow in FIG. 1.

A bracket 66 is secured to the wall 11 by a pair of fasteners 67. The bracket 66 is bent over at its upper end to provide a dependent flange 71. The upper face of the flange 71 is covered with a coating or layer 72 of polytetrafluoroethylene to provide an antifriction surface. A similar but allochiral bracket 74 is secured on the wall 10. The bracket 74 is formed with a dependent flange 76. Both flanges 71, 76 are inclined relative to the planar path that is followed by the belt 61 when it is tracking properly. The upper, coated surface of the flange 71, and the upper, coated surface of the corresponding flange 76 of the opposite bracket 74, are disposed respectively at opposite lateral sides of the belt 61, and are so positioned that during proper tracking of the belt, no contact is made with the belt. Both brackets 66, 74, are spaced from the cylindrical pulley 34 along the path of the belt, in the direction of belt travel from the pulley 34, and for greatest effect in maintaining the belt accurately centered on pulley 34, the brackets are located in close proximity to the pulley.

Figure 6:
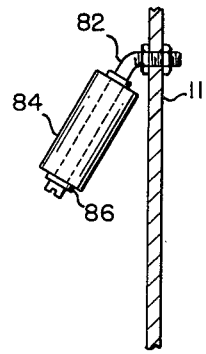
FIG. 6 is a sectional view similar to FIG. 5, but showing a modification of the invention.

Instead of brackets 66, 74, with their inclined flanges 71, 76, respectively, rotatable members, that present inclined surfaces to the marginal portions of the belt, can be used. For example, as shown in FIG. 6, a bent shaft 82 is secured to the wall 11. A roller 84 is mounted on an antifriction bearing 86 on the downwardly depending portion of the shaft 82. A similar roller arrangement would be mounted on the wall 10, at the opposite side of the belt.

The materials of construction for the various parts of the device can be selected so as to perform the required functions. The particular materials named herein are specified by way of example only. The transparent tube 48 preferably is made of glass, but may also be formed of a transparent, tough plastic material that possesses sufficient heat resistance.

In operation of the document copier, a document that is to be copied, and a sheet of sensitized material, are assembled and are inserted between the belt 61 and the tube 48, while the belt is moving in the direction shown by the arrow in FIG. 1. This assembly is gripped frictionally between the belt 61 and the tube 48, and is carried around the tube as the tube is rotated upon movement of the belt. The sensitized material is exposed by radiation, such as, for example, radiation from the bulbs that is transmitted through the transparent wall of the tube 48. The exposure is completed by the time the assembly begins to be discharged at the lower portion of the tube.

The self-correcting feature can be demonstrated by assuming that during this operation of the copier, the belt begins to creep over to the right, looking at the copier of FIG. 2. As this occurs, the right marginal edge portion of the belt, including the wear strip 62', engages against the upper surface of the flange 71, and begins to ride up on this surface and out of its normal belt path as seen dotted in FIG. 1. This produces a force on flange 71 and a reacting force on the belt edge, tilting the cylindrical pulley 34 in a plane passing through the axis of shaft 26 and substantially perpendicular to the bisector line AC and in a generally counterclockwise direction as seen in FIG. 2, to raise its right end and to lower its left end. In other words, the edge of the belt that is shifted out of its normal belt path by virtue of flange 71 and the right end of roller 34 are both raised. This tends to cause the belt to move toward the left and to become realigned for proper tracking. As this occurs, the belt gradually disengages the coated, contact surface of the flange 71; the force exerted by the belt 48 on the cylindrical roller 34, that tends to tilt the cylindrical roller 34, decreases; the cylindrical roller 34 shifts back so that its axis of rotation again is in parallelism with the axis of rotation of the guide rollers 14, 15; until the belt is tracking properly again. A similar corrective action occurs when the belt shifts to the left relative to FIG. 2 rather than to the right.

In a document copier that is constructed in accordance with the present invention, the belt is kept tracking near its normal position, without undue wear on the belt, and despite wide assembly tolerances and field conditions that tend to cause the belt to move away from its proper tracking position.

To minimize the wear that occurs on the belt, the flanges 71, 76, preferably are arched, as shown in the drawings, to conform to the path followed by the belt as it travels over them. Rollers, such as the roller 84 in FIG. 6, provide the same type of contour and, since a roller is rotated upon movement of the belt, even further avoid frictional wear on the belt. Conical or other rollers can be used rather than the cylindrical rollers shown. Antifriction coatings are advantageous in all cases in reducing wear on the belt.

To facilitate rocking movement of the pulley 34, it is preferred that the axes of rotation of the pulleys 14, 15, and 34, during proper tracking of the belt, be disposed substantially in parallelism, and at the apices of A, B, D of a trangle that is isosceles when taken in a plane that is perpendicular to these axes. Moreover, for best results, it is advantageous to locate the axis of rotation of the transparent tube 48 in parallelism with the axes of rotation of the pulleys 14, 15, and along a line AC that is the vertical bisector of the line BD.

In the document copier that is illustrated in the drawings, and that represents a preferred embodiment of the invention, the belt 61 engages the tube 48 over more than 180 degrees of the tube surface. The two pulleys 14, 15 are disposed with their axes of rotation in a plane that is parallel to the axis of rotation of the tube 48, and that is on a side of the tube axis that is remote from the pulley 34.

The brackets 66, 74, are formed from rectangular metal straps that preferably are mounted with their sides substantially perpendicular to the associated reach of the belt, as shown in FIG. 1, but this arrangement can be modified, as can the spacing of the brackets from the tiltable pulley 34. One important factor in the relationship between the brackets and the tiltable pulley 34 is that the brackets are positioned along the path of the belt in the direction of movement of the belt away from that pulley, and intermediate that pulley and the next pulley about which the belt is passed.

While this invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. In a belt tracking mechanism, the combination comprising:
    a plurality of rollers spaced from one another with their axes of rotation normally substantially parallel,
    an endless belt trained over said rollers and guided thereby to move over a normal belt path when all of said rollers are substantially parallel,
    means for driving said belt along said path defined by said rollers, and
    means for automatically correcting for any improper tracking of said belt as it moves in said path about said rollers, and including
    a mounting for at least one of said rollers providing for tilting and shifting of the axis of rotation of the roller from parallel relation with respect to an adjacent roller,
    a fixed guide member mounted at each side of said belt adjacent said tiltable roller and between the same and the next succeeding roller in the direction of travel of said belt and between which guide members said belt moves when it is tracking properly over said rollers,
    each of said guide members being inclined away from the edge of the belt adjacent thereto to form a ramp intersecting the plane of the reach of belt between said tiltable roller and said succeeding roller of said normal belt path, and on which the corresponding edge of said belt will move in an upwardly direction when said edge is forced along said ramp upon improper tracking of said belt from said normal belt path, and in response to which movement the tiltable roller will be tilted to cause the end thereof corresponding to the edge of said belt moving up said ramp to move in said upwardly direction so as to correct for the improper tracking of the belt.

2. The invention according to claim 1 wherein each of said guide members comprises a fixed bracket having a bent end disposed at an angle with respect to a corresponding edge of said belt.

3. The invention according to claim 1 wherein each of said guide members comprises a fixed bracket supporting a rotatable roller disposed at an angle with respect to a corresponding edge of said belt.

4. The invention according to claim 2 wherein said bent end is provided with a contact surface of anti-friction material.

5. The invention according to claim 1 wherein said pulleys are mounted so that lines interconnecting their axes along a plane perpendicular thereto form an isosceles triangle, and the tiltable pulley is tilted in a plane perpendicular to a vertical bisector of said triangle.

References Cited in the file of this patent
UNITED STATES PATENTS

| | | |
|---|---|---|
| 1,818,685 | Brunk | Aug. 11, 1931 |
| 2,262,325 | Kendall | Nov. 11, 1941 |
| 2,488,859 | Garber | Nov. 22, 1949 |
| 2,869,712 | Kindig | Jan. 20, 1959 |
| 2,924,273 | Conley et al. | Feb. 9, 1960 |
| 2,950,809 | Sinden | Aug. 30, 1960 |
| 3,053,425 | Baines | Sept. 11, 1962 |